(12) United States Patent
Akiyama et al.

(10) Patent No.: US 8,629,804 B2
(45) Date of Patent: Jan. 14, 2014

(54) EXECUTION METHOD OF POSITION CALCULATING CIRCUIT, POSITION CALCULATING CIRCUIT, OPERATION CONTROL METHOD OF POSITION CALCULATING CIRCUIT, HOST DEVICE, AND ELECTRONIC APPARATUS

(75) Inventors: Toshikazu Akiyama, Matsumoto (JP); Hidekazu Maezawa, Shiojiri (JP); Norio Teruuchi, Shiojiri (JP); Kazunari Kobayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 290 days.

(21) Appl. No.: 12/902,091

(22) Filed: Oct. 11, 2010

(65) Prior Publication Data

US 2011/0084875 A1    Apr. 14, 2011

(30) Foreign Application Priority Data

Oct. 13, 2009  (JP) .................. 2009-235998

(51) Int. Cl.
*G01S 19/03* (2010.01)

(52) U.S. Cl.
USPC ....................... 342/357.4

(58) Field of Classification Search
USPC ............ 342/357.4; 709/231–216, 238, 709/FOR. 116, FOR. 117, FOR. 118, 709/FOR. 141
See application file for complete search history.

(56) References Cited

U.S. PATENT DOCUMENTS

| | | | | |
|---|---|---|---|---|
| 5,524,212 A | * | 6/1996 | Somani et al. | 711/121 |
| 5,854,639 A | * | 12/1998 | Miyoshi | 345/541 |
| 8,077,551 B2 | | 12/2011 | Fujisawa | |
| 2007/0126627 A1 | | 6/2007 | Ueno et al. | |
| 2010/0057349 A1 | * | 3/2010 | Akiyama | 342/357.02 |
| 2012/0051191 A1 | | 3/2012 | Fujisawa | |

FOREIGN PATENT DOCUMENTS

| | | | |
|---|---|---|---|
| CN | 101114242 A | * | 1/2008 |
| JP | 10-082875 A | | 3/1998 |
| JP | 2004-061336 A | | 2/2004 |
| JP | 2004070642 A | * | 3/2004 |
| JP | 2006-017498 A | | 1/2006 |
| JP | 2007-156856 A | | 6/2007 |
| JP | 2009-053182 A | | 3/2009 |
| JP | 2009-229106 A | | 10/2009 |

OTHER PUBLICATIONS

English translation of JP 2004070642 A.*
English translation of JP 2009229106 A.*

* cited by examiner

*Primary Examiner* — Jack W Keith
*Assistant Examiner* — Fred H Mull
(74) *Attorney, Agent, or Firm* — Kilpatrick Townsend & Stockton LLP

(57) ABSTRACT

An execution method of a position calculating circuit that calculates a position by receiving a satellite signal transmitted from a positioning satellite and that has an externally readable storage section includes: receiving a selection signal for selecting acquired information, which is information acquired from information obtained from the satellite signal, from the outside; selecting the acquired information on the basis of the selection signal; and storing the acquired information in the storage section and outputting a notice signal, which indicates that the acquired information has been obtained, when the acquired information selected from the satellite signal being received is obtained.

7 Claims, 11 Drawing Sheets

| AREA | COORDINATE RANGE | TIME DIFFERENCE FROM WORLD STANDARD TIME |
|---|---|---|
| ARGENTINE | $(X_{11},Y_{11}) \sim (X_{12},Y_{12})$ | -3 HOURS |
| NEW YORK | $(X_{21},Y_{21}) \sim (X_{22},Y_{22})$ | -5 HOURS |
| SAN FRANCISCO | $(X_{31},Y_{31}) \sim (X_{32},Y_{32})$ | -8 HOURS |
| HAWAII | $(X_{41},Y_{41}) \sim (X_{42},Y_{42})$ | -10 HOURS |
| SYDNEY | $(X_{51},Y_{51}) \sim (X_{52},Y_{52})$ | +10 HOURS |
| JAPAN | $(X_{61},Y_{61}) \sim (X_{62},Y_{62})$ | +9 HOURS |
| ... | ... | ... |

FIG. 7

EXECUTION METHOD OF POSITION CALCULATING CIRCUIT, POSITION CALCULATING CIRCUIT, OPERATION CONTROL METHOD OF POSITION CALCULATING CIRCUIT, HOST DEVICE, AND ELECTRONIC APPARATUS

BACKGROUND

1. Technical Field

The present invention relates to an execution method of a position calculating circuit, which calculates the position by receiving a satellite signal transmitted from a positioning satellite, and the like.

2. Related Art

A GPS (global positioning system) is widely known as a positioning system using a positioning signal and is also used as a position calculating circuit built into a mobile phone, a car navigation apparatus, or the like. The position calculating circuit performs position calculation processing for calculating the three-dimensional coordinate values, which indicate the position of the position calculating circuit, and a timepiece error on the basis of the information, such as the positions of a plurality of GPS satellites or a pseudo distance from each GPS satellite to the position calculating circuit.

As such a position calculating circuit has come into wide use, the application range of the position calculating circuit has also expanded. That is, the position calculating circuit is increasingly being mounted in products (electronic apparatuses) other than a product (electronic apparatus) whose main purpose is to indicate the position for the user. For example, a technique is known in which a position calculating circuit is mounted in a digital camera and the photographing location is recorded corresponding to a photographed image. In an electronic apparatus which mounts a position calculating circuit therein, a processor which performs overall control of the electronic apparatus is generally provided. In general, transmission of the position data from the position calculating circuit to the processor of the electronic apparatus is performed whenever the position calculating circuit calculates the position or at predetermined intervals (for example, every one second).

However, if the output interval of the position data is short, interruption processing should be frequently performed on the processor side. In this case, a problem occurs in that the processing load increases. As a technique for solving this problem, JP-A-2007-156856 discloses a technique of setting long the output interval of the position data from a position calculating circuit.

As described above, generally, the known position calculating circuit is configured to supply the position data actively to the processor of the electronic apparatus. In other words, this means that the processor of the electronic apparatus acquires the position data passively from the position calculating circuit. Accordingly, for example, even at a timing at which the position data is needed, the position data is not always input from the position calculating circuit to the processor of the electronic apparatus. Thus, there was a constraint on the acquisition of data in that the input of the newest position data from the position calculating circuit should be waited for. Similarly, although the position calculating circuit can calculate not only the position but also various kinds of information, such as the time and the moving speed, there was the same problem regarding the acquisition of these data items on the processor side of the electronic apparatus.

In addition, the position calculating circuit may be configured such that not only the position data but also data other than the position data, such as the time data, is acquired by performing the position calculation. In this case, in the technique disclosed in JP-A-2007-156856, it is necessary to supply the data to the processor of the electronic apparatus by performing communication interrupt whenever the position calculating circuit acquires a plurality of kinds of data. Accordingly, even if the interval of data output from the position calculating circuit is set to be long, the communication load per position calculation is not reduced. This was not sufficient in terms of the reduction of power consumption.

SUMMARY

An advantage of some aspects of the invention is to propose a technique for improving convenience in acquiring the information from a position calculating circuit. Another advantage of some aspects of the invention is to reduce the power consumption related to the information acquisition from the position calculating circuit.

A first aspect of the invention is directed to an execution method of a position calculating circuit that calculates a position by receiving a satellite signal transmitted from a positioning satellite and that has an externally readable storage section including: receiving a selection signal for selecting acquired information, which is information acquired from information obtained from the satellite signal, from the outside; selecting the acquired information on the basis of the selection signal; and storing the acquired information in the storage section and outputting a notice signal, which indicates that the acquired information has been obtained, when the acquired information selected from the satellite signal being received is obtained.

According to the first aspect of the invention, the selection signal for selecting the acquired information from the information acquired from the satellite signal is input from the outside. In addition, the acquired information is selected on the basis of the input selection signal. When the acquired information selected from the satellite signal being received is obtained, the acquired information is stored in the externally readable storage section provided in the position calculating circuit, and the notice signal indicating that the acquired information has been obtained is output. Since the storage section which stores the acquired information is externally readable, it is possible to read the acquired information from the outside at an arbitrary timing after a notice signal is output. In addition, since the acquired information is selected on the basis of the selection signal input from the outside and the notice signal indicating that the acquired information has been obtained is output, it is possible to omit useless communication while obtaining the acquired information. As a result, the power consumption related to the information acquisition from the position calculating circuit can be reduced.

According to a second aspect of the invention, the execution method according to the first aspect of the invention may be configured such that the information obtained from the satellite signal includes time information. Moreover, the execution method may further include outputting a periodic signal to the outside at predetermined intervals synchronized with the time information when the acquired information is the time information and the time information is obtained from the satellite signal being received.

According to the second aspect of the invention, when the acquired information is the time information and the time information is obtained from the satellite signal being received, a periodic signal is output to the outside at predetermined intervals synchronized with the time information.

Therefore, for example, in an electronic apparatus including the position calculating circuit and a time measuring section, it becomes possible to correct a time, which is measured by the time measuring section, precisely according to the periodic signal output from the position calculating circuit.

According to a third aspect of the invention, the execution method according to the first or second aspect of the invention may be configured such that the information obtained from the satellite signal includes time information and position information. When the acquired information is the position information, position calculation processing may be executed in which the position is calculated by acquiring the time information from the satellite signal and calculating a pseudo distance. Position information, which indicates the position calculated by the position calculation processing, and time information, which is calculated during the execution of the position calculation processing, may be stored in the storage section.

According to the third aspect of the invention, when the acquired information is the position information, the position calculation processing is executed in which the position is calculated by acquiring the time information from the satellite signal and calculating the pseudo distance. In addition, the position information indicating the position calculated by the position calculation processing and the time information calculated during the execution of the position calculation processing are stored in the storage section. As a result, not only the position information but also the time information can be acquired from the outside.

A fourth aspect of the invention is directed to a position calculating circuit that calculates a position by receiving a satellite signal transmitted from a positioning satellite including: an externally readable storage section; a selection section that receives a selection signal for selecting acquired information, which is information acquired from information obtained from the satellite signal, from the outside and selects the acquired information; and a storage control section that stores the acquired information in the storage section when the acquired information selected from the satellite signal being received is obtained.

According to the fourth aspect of the invention, the selection section of the position calculating circuit receives from the outside a selection signal for selecting the acquired information from the information obtained from the satellite signal and selects the acquired information. In addition, when the acquired information selected from the satellite signal being received is obtained, the storage control section stores the acquired information in the externally readable storage section. Since the acquired information is stored in the externally readable storage section when the acquired information is obtained, it is possible to read the acquired information from the outside any time.

A fifth aspect of the invention is directed to an operation control method of controlling an operation of the position calculating circuit according to the fourth aspect of the invention including: outputting the selection signal to the position calculating circuit: determining whether or not the acquired information is stored in the storage section; and reading the acquired information from the storage section when the acquired information is stored in the storage section.

A sixth aspect of the invention is directed to a host device that controls an operation of the position calculating circuit according to the fourth aspect of the invention including: a selection signal output section that generates the selection signal on the basis of a user's selection operation and outputs the selection signal to the position calculating circuit; a determination section that determines whether or not the acquired information is stored in the storage section; and a reading section that reads the acquired information from the storage section when the determination section determines that the acquired information is stored in the storage section.

According to the fifth or sixth aspect of the invention, the selection signal is output to the position calculating circuit. In addition, it is determined whether or not the acquired information is stored in the storage section, and the acquired information is read from the storage section when the acquired information is stored in the storage section. Thus, the same effects as in the first aspect of the invention are obtained. In particular, according to the sixth aspect of the invention, the host device can acquire the information that the user needs from the position calculating circuit at an arbitrary timing, without time constraints.

A seventh aspect of the invention is directed to an electronic apparatus including: the host device according to the sixth aspect of the invention; and the position calculating circuit according to the fourth aspect of the invention to which data is input from the host device through a data bus or which outputs data to the host device through the data bus. The host device outputs to the position calculating circuit a circuit selection signal for selecting a circuit which performs data input and output, and the host device reads the acquired information from the storage section of the position calculating circuit.

According to the seventh aspect of the invention, the circuit selection signal for selecting a circuit which performs data input and output is output to the position calculating circuit by the host device. In addition, the acquired information is read from the storage section of the position calculating circuit by the host device.

An eighth aspect of the invention is directed to an electronic apparatus including: the position calculating circuit according to the fourth aspect of the invention; the host device according to the sixth aspect of the invention; and a time measuring section that measures a time. The information obtained from the satellite signal includes time information and position information. The selection signal output section of the host device outputs a selection signal which selects the time information and the position information as the acquired information. The host device further includes a time correcting section that corrects a time error, which includes a time difference of the time measured by the time measuring section, using the position information and the time information which are the acquired information read by the reading section.

According to the eighth aspect of the invention, the selection signal which selects the time information and the position information as the acquired information is output by the selection signal output section of the host device. Moreover, a time error including a time difference of the time measured by the time measuring section is corrected using the position information and the time information which are the acquired information read by the reading section. Here, the time difference means a difference between the standard time in a certain area and the standard time in another area. Time correction including time difference correction can be performed by acquiring the position information and referring to the time difference at the position indicated by the position information.

A ninth aspect of the invention is directed to an electronic apparatus including: the position calculating circuit according to the fourth aspect of the invention; and the host device according to the sixth aspect of the invention. The position calculating circuit further includes an acquisition notifying section that transmits to the host device a notice signal, which indicates that the acquired information has been obtained, when the acquired information is obtained from the satellite signal. The host device further includes: a notice detecting section that detects input of the notice signal; and a mode transition control section that makes the host device transit to a sleep mode after outputting the selection signal to the position calculating circuit and that makes the host device return to a running mode in response to the detection of the notice detecting section.

According to the ninth aspect of the invention, when the acquired information has been obtained from the satellite signal, the notice signal indicating that the acquired information has been obtained is notified to the host device. On the other hand, the host device transits to the sleep mode after outputting the selection signal to the position calculating circuit, and returns to the running mode in response to the input detection of the notice signal. Since the host device is in the sleep mode until a notice signal is received from the position calculating circuit after outputting a selection signal to the position calculating circuit, the power consumption can be further reduced.

BRIEF DESCRIPTION OF THE DRAWINGS

The invention will be described with reference to the accompanying drawings, wherein like numbers reference like elements.

FIG. 7 is a diagram showing an example of the data configuration of time difference data.

DESCRIPTION OF EXEMPLARY EMBODIMENTS

Hereinafter, preferred embodiments of the invention will be described with reference to the accompanying drawings. The case where the invention is applied to a wristwatch, which is a kind of electronic apparatus, will be described below. In addition, it is obvious that embodiments to which the invention can be applied are not limited to the embodiment to be described below.

1. Configuration of External Appearance

Figure 1:
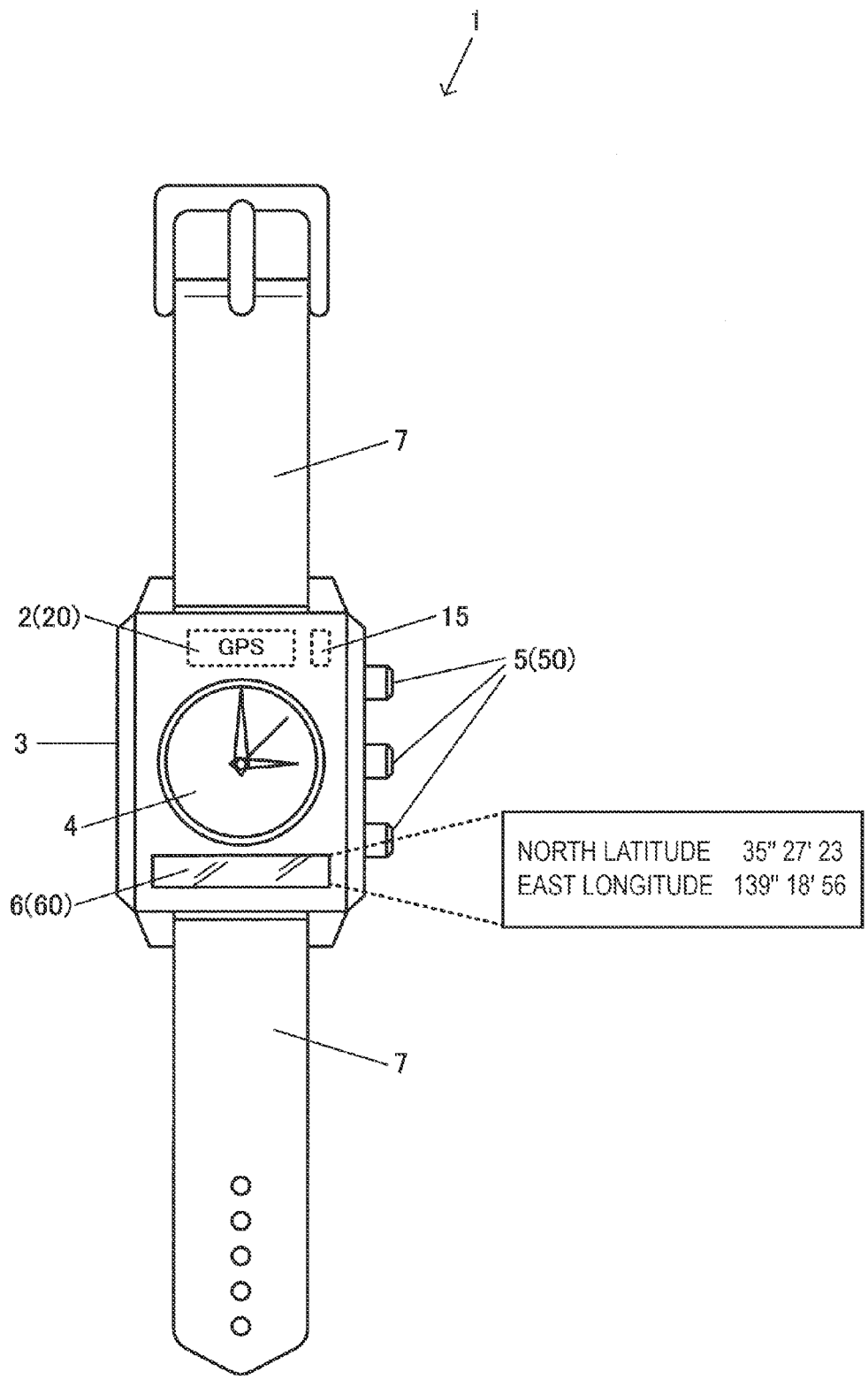
FIG. 1 is a diagram showing the schematic configuration of a wristwatch.

FIG. 1 is a diagram showing the configuration of the external appearance of a wristwatch 1 in the present embodiment. The wristwatch 1 is an electronic apparatus that a user wears on his or her arm, and has not only an original function as a watch that measures a time but also a function of calculating and outputting the position of the wristwatch 1 since a GPS position calculating circuit 2, which performs position calculation on the basis of a GPS satellite signal received from a GPS (Global Positioning System) satellite, is built into the wristwatch 1. The wristwatch 1 has an analog hand watch unit which indicates a time with hands, but the time may also be displayed on a display 6 in a digital form. In addition, the position of the wristwatch 1 is displayed on the display 6.

Specifically, a GPS antenna 15, which receives a GPS satellite signal from a GPS satellite, and the GPS position calculating circuit 2 as a GPS position calculating unit 20 are built into the wristwatch 1. In addition, the wristwatch 1 includes an analog watch unit 4 disposed in a case 3, the display 6 as a display unit 60, a button switch 5 as an input unit 50, and a band 7 which winds around a user's arm when the user wears it.

2. Functional Configuration

Figure 2:
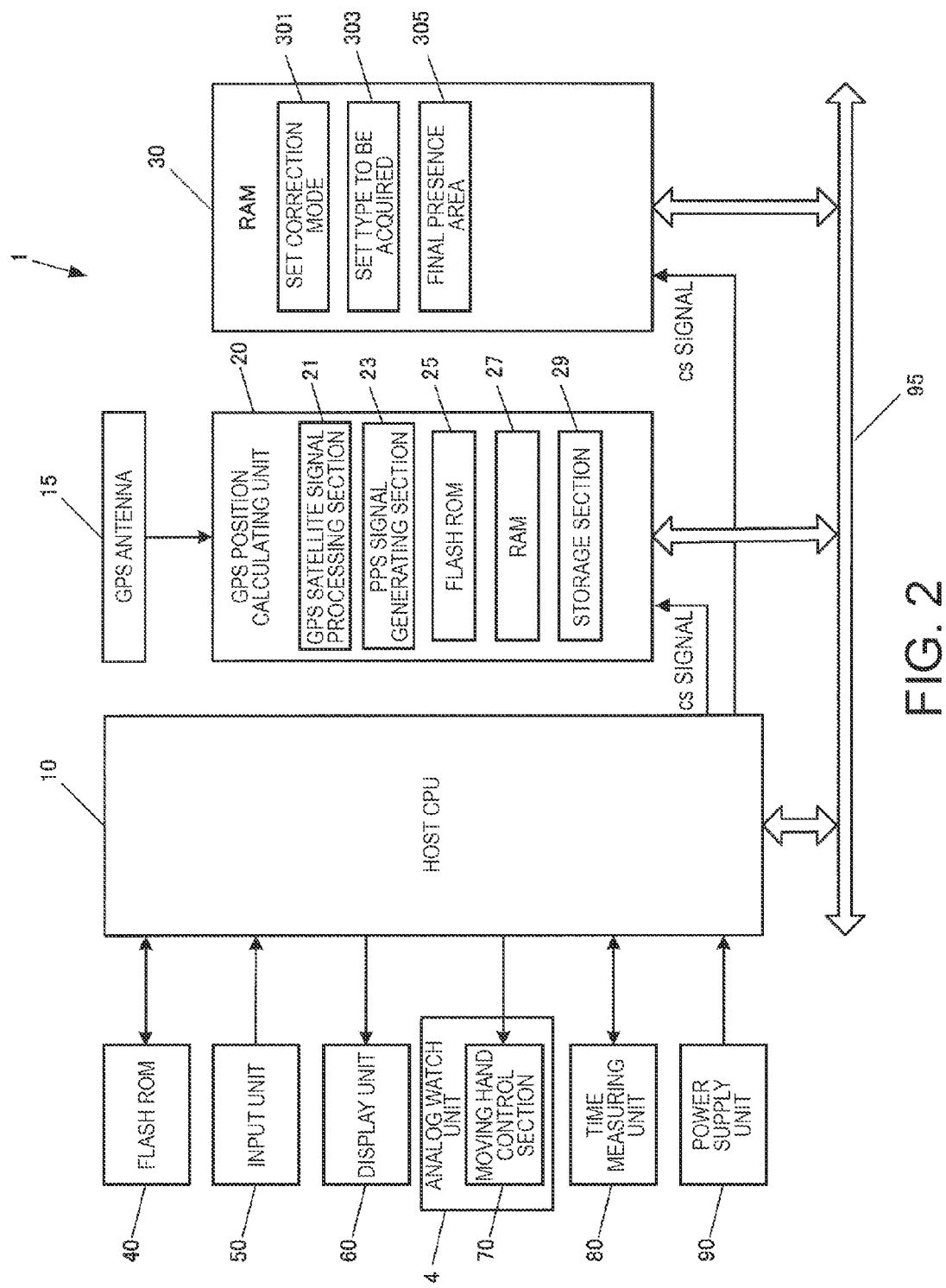
FIG. 2 is a block diagram showing the functional configuration of a wristwatch.

FIG. 2 is a diagram showing the functional configuration of the wristwatch 1. The wristwatch 1 is configured to include a host CPU (Central Processing Unit) 10, a GPS antenna 15, the GPS position calculating unit 20, a RAM (Random Access Memory) 30, a flash ROM (Read Only Memory) 40, the input unit 50, the display unit 60, a moving hand control section 70 included in the analog watch unit 4, a time measuring unit 80, and a power supply unit 90.

The host CPU 10 is a processor which performs overall control of the units of the wristwatch 1 according to various programs, such as a system program, stored in the flash ROM 40, and functions as a host device. In the present embodiment, the host CPU 10 performs time correction processing and time difference correction processing, in response to a user's instruction, using the time data, the position data, and the like that the GPS position calculating unit 20 has acquired or calculated on the basis of GPS satellite signals.

The host CPU 10 is connected to the GPS position calculating unit 20 and the RAM 30 through a data bus 95, and the GPS position calculating unit 20 and the RAM 30 form a peripheral circuit when the host CPU 10 inputs or outputs the data through the data bus 95. The host CPU 10 changes the peripheral circuit, which performs input or output of the data through the data bus 95, selectively to either the GPS position calculating unit 20 or the RAM 30 by outputting a chip select (cs) signal, which is a kind of circuit selection signal.

The GPS antenna 15 is an antenna that receives an RF (Radio Frequency) signal including a GPS satellite signal transmitted from a GPS satellite. In addition, the GPS satellite signal is a signal, which is obtained by spectrum modulation using a C/A code that is a PRN code, and is superimposed on a carrier which has a carrier frequency of 1.57542 [GHz] and is in a band of L1.

The GPS position calculating unit 20 is one of the peripheral circuits which acquire and calculate various kinds of data, such as position data and time data, using the GPS which is a kind of satellite position calculating system, and is a functional block equivalent to a GPS receiver. The GPS position calculating unit 20 includes a GPS satellite signal processing section 21, a PPS (Pulse Per Second) signal generating section 23, a flash ROM 25 and a RAM 27, and a storage section 29. The GPS position calculating unit 20 is equivalent to the GPS position calculating circuit 2 shown in FIG. 1.

The GPS satellite signal processing section 21 is a circuit section which performs position calculation by processing a GPS satellite signal received by the GPS antenna 15 and includes a signal processing circuit, such as an RF receiving circuit or a baseband processing circuit, and a processor for controlling these circuits.

The PPS signal generating section 23 is a signal transmission circuit which transmits a periodic signal needed when the host CPU 10 corrects the time of the time measuring unit 80. A PPS signal is a pulse signal synchronized with the time data that the GPS position calculating unit 20 has acquired and calculated on the basis of a GPS satellite signal, and is a periodic signal which is periodically transmitted at predetermined intervals. Specifically, a pulse is generated at the timing of second update. The host CPU 10 matches a timing of second update of the time measuring unit 80 to a pulse timing of the PPS signal on the basis of the PPS signal transmitted from the PPS signal generating section 23 and the time data 291 read from the storage section 29. Thus, a time can be corrected at a timing of a correct second.

In the time correction processing using Z-COUNT which will be described later, a time can be corrected, for example, with a precision of 20 msec or less. Moreover, in the time difference correction processing to be described later, a time can be corrected, for example, with a precision of 1 nsec or less using a timepiece error acquired by position calculation.

The flash ROM 25 is a readable and writable/erasable nonvolatile storage device and stores various programs such as a system program, various data, and the like, which are used when the GPS satellite signal processing section 21 controls each section of the GPS position calculating unit 20.

The RAM 27 is a readable and writable volatile storage device and serves as a work area in which a system program executed by the GPS satellite signal processing section 21, various processing programs, data being processed in various kinds of processing, a processing result, and the like are temporarily stored.

The storage section 29 is an externally readable storage device which holds the operation or execution state of the GPS satellite signal processing section 21. For example, the storage section 29 is realized by a memory circuit, such as a register. The data acquired by demodulating a GPS satellite signal by the GPS satellite signal processing section 21 or various kinds of data acquired by performing position calculation or calculation of the moving speed and the moving direction calculation are stored in the storage section 29.

The RAM 30, which is one of the peripheral circuits, serves as a work area in which a system program executed by the host CPU 10, various processing programs, data being processed in various kinds of processing, a processing result, and the like are temporarily stored.

The flash ROM 40 is a storage device which stores a system program, which is used when the host CPU 10 controls the wristwatch 1, and various programs or data for realizing various functions.

The input unit 50 is an input device formed by a button switch, for example, and outputs a signal of a pressed button to the host CPU 10. By the operation of the input unit 50, various instructions, such as mode selection and a position calculation request, are input. The input unit 50 is equivalent to the button switch 5 shown in FIG. 1.

The display unit 60 is a display device formed by using an LCD (Liquid Crystal Display), for example, and performs various kinds of display on the basis of a display signal input from the host CPU 10. Position information or current time measured by the time measuring unit 80 is displayed on the display unit 60. The display unit 60 is equivalent to the display 6 shown in FIG. 1.

The moving hand control section 70 is a control device which controls the driving of a watch hand of the analog watch unit 4. The moving hand control section 70 controls movements of an hour hand, a minute hand, and a second hand on the basis of a control signal from the host CPU 10. In the present embodiment, moving hand correction control is performed such that the watch hands indicate a time corrected by performing time correction processing and time difference correction processing by the host CPU 10.

The time measuring unit 80 is a time measuring circuit which measures a time according to the control of the host CPU 10, and outputs the time to the host CPU 10. The power supply unit 90 is a power supply device which supplies electric power for driving to each functional unit provided in the wristwatch 1.

3. Data Configuration

Figure 3:
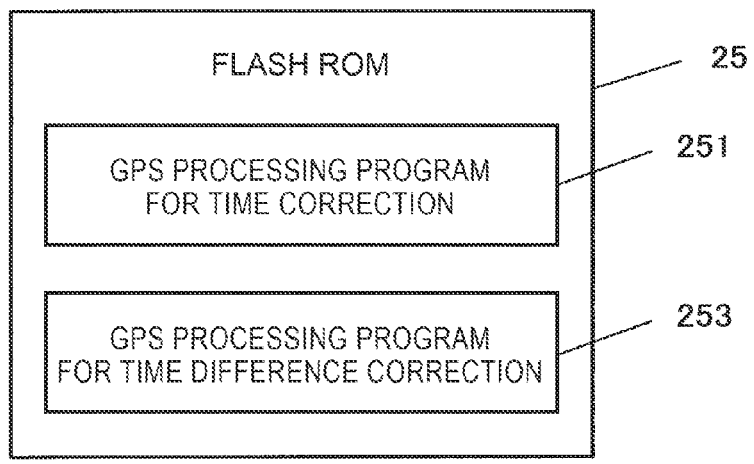
FIG. 3 is a diagram showing an example of the data configuration of a flash ROM of a GPS position calculating unit.

FIG. 3 is a diagram showing an example of the data stored in the flash ROM 25 of the GPS position calculating unit 20. A GPS processing program 251 for time correction, which is read by the GPS satellite signal processing section 21 and is executed as GPS processing for time correction (refer to FIGS. 9 and 10), and a GPS processing program 253 for time difference correction, which is read by the GPS satellite signal processing section 21 and is executed as GPS processing for time difference correction (refer to FIG. 11), are stored in the flash ROM 25.

Figure 4:
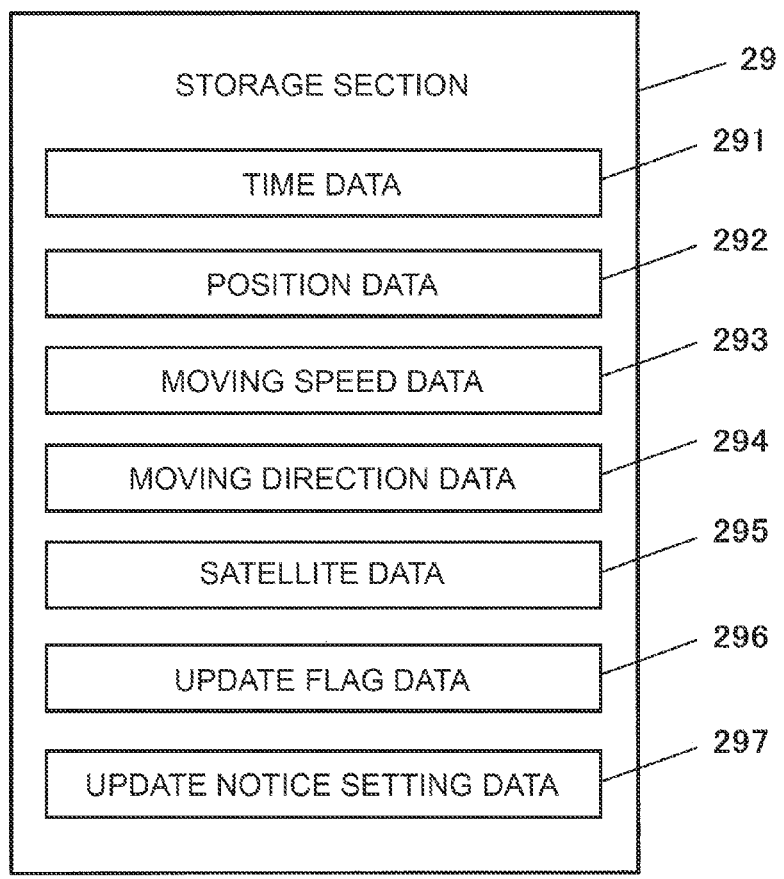
FIG. 4 is a diagram showing an example of the data configuration of a storage section.

FIG. 4 is a diagram showing an example of the data stored in the storage section 29 of the GPS position calculating unit 20. The time data 291, position data 292, moving speed data 293, moving direction data 294, satellite data 295, update flag data 296, and update notice setting data 297 are stored in the storage section 29.

The time data 291 is data of a time that the host CPU 10 acquires on the basis of a GPS satellite signal. The time data 291 is obtained by demodulating a GPS satellite signal in the time correction processing. A GPS satellite transmits the time information every 6 seconds in a state where it is included in Z-COUNT of a navigation message. Accordingly, it is possible to acquire the time information by demodulating the GPS satellite signal to acquire the navigation message.

Moreover, in the time difference correction processing, a pseudo distance between a GPS satellite and the wristwatch 1 is calculated using the satellite data 295 and the time data 291 which are calculated using the navigation message obtained by demodulating the GPS satellite signal, and position calculation using this pseudo distance is performed. In the position calculation, calculation in which the three-dimensional coordinate values indicating the position of the wristwatch 1 and a timepiece error are unknown quantities is performed, and the calculated position information (coordinate values) is stored as the position data 292. In addition, the correct time information is acquired using the calculated timepiece error and is then stored as the time data 291.

As the moving speed data 293 and the moving direction data 294, data of the moving speed and the moving direction of the wristwatch 1, which is obtained by performing calculation based on a known method using a temporal change of the Doppler frequency of a GPS satellite signal or the like, is stored. In addition, since this kind of calculation is known, a detailed explanation thereof will be omitted.

The satellite data 295 is data regarding GPS satellites, such as the position, the moving speed, and the moving direction of each GPS satellite, and is calculated on the basis of a navigation message obtained by demodulating a GPS satellite signal.

Figure 5:
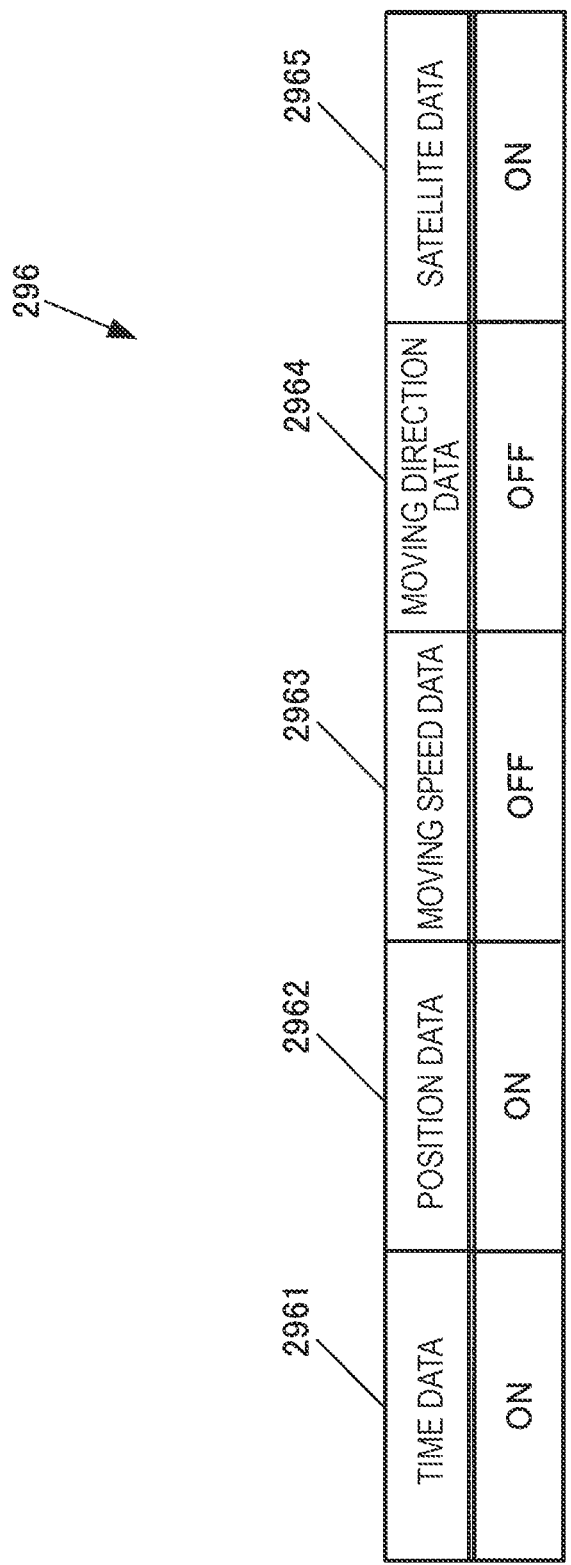
FIG. 5 is a diagram showing an example of the data configuration of update flag data.

The update flag data 296 is data indicating whether or not various kinds of data stored in the storage section 29 have been updated. An example of the data configuration is shown in FIG. 5. The update flag data 296 includes an update flag 2961 of the time data 291, an update flag 2962 of the position data 292, an update flag 2963 of the moving speed data 293, an update flag 2964 of the moving direction data 294, and an update flag 2965 of the satellite data 295. Each update flag is set to "ON" when the corresponding data is updated (newly stored) and set to "OFF" when the corresponding data is read from the storage section 29 by the host CPU 10.

The update notice setting data 297 indicates the type of data to be notified to the host CPU 10 (hereinafter, referred to as "data to be notified") among the time data 291 to the satellite data 295. The type of data to be notified is set and updated on the basis of a type selection signal, which is output from the host CPU 10 to the GPS position calculating unit 20. The type of data that the host CPU 10 is to acquire (hereinafter, referred to as "data to be acquired") is included in the type selection signal.

Figure 6:
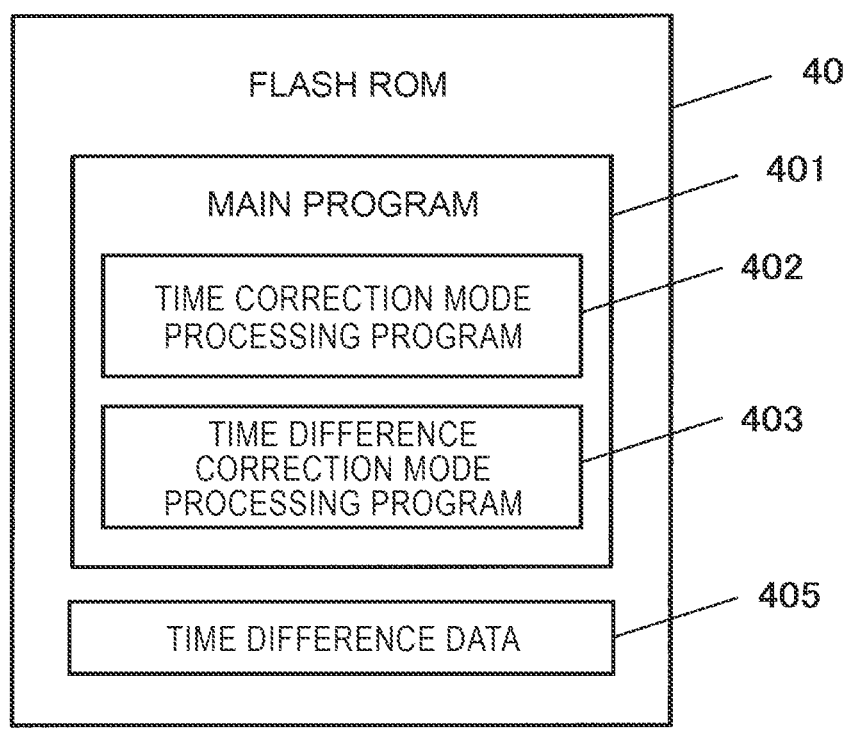
FIG. 6 is a diagram showing an example of the data configuration of a flash ROM of a wristwatch.

FIG. 6 is a diagram showing an example of the data stored in the flash ROM 40. A main program 401, which is read by the host CPU 10 and is executed as main processing (refer to FIG. 8), and time difference data 405 are stored in the flash ROM 40. In addition, a time correction mode processing program 402 executed as time correction mode processing (refer to FIGS. 9 and 10) and a time difference correction mode processing program 403 executed as time difference correction mode processing (refer to FIG. 11) are included in the main program 401 as a subroutine. Details of the processing will be described later using a flow chart.

FIG. 7 is a diagram showing an example of the data configuration of the time difference data 405. A plurality of areas 4051, a coordinate range 4053 indicating the range of a corresponding area with the coordinate values, and a time difference 4055 of a corresponding area from the world standard time are stored in the time difference data 405 so as to match each other. The host CPU 10 specifies the area 4051 where the wristwatch 1 is currently located by determining the coordinate range 4053 where the coordinate value, which is indicated by the position data 292 read from the storage section 29, is included, in the time difference correction processing. Then, the host CPU 10 corrects the time difference of the wristwatch 1 by reading the time difference 4055 corresponding to the specified area 4051 and advancing or delaying the time data 291 on the basis of the read time difference 4055.

A set correction mode 301 indicating a correction mode that is set, a set type to be acquired 303 indicating the type of data that the host CPU 10 sets as an object to be acquired, and a final presence area 305 indicating the area where the wristwatch 1 was present when the wristwatch 1 calculated the position finally are stored in the RAM 30, as shown in FIG. 2.

4. Flow of Processing

Figure 8:
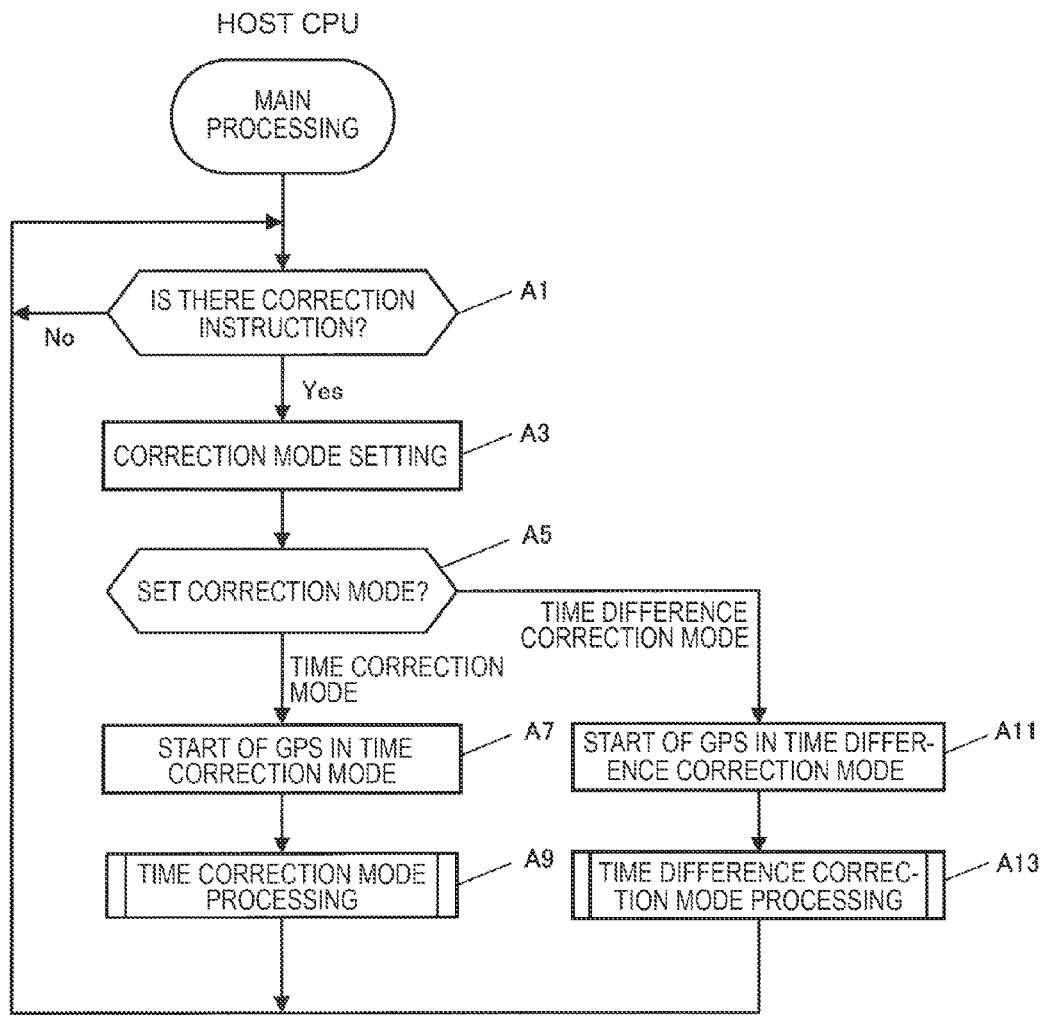
FIG. 8 is a flow chart showing the flow of main processing.

FIG. 8 is a flow chart showing the flow of main processing executed in the wristwatch 1 when the main program 401 stored in the flash ROM 40 is read and executed by the host CPU 10. The main processing is a processing which is continuously executed while electric power is being supplied by the power supply unit 90.

First, the host CPU 10 determines whether or not the user has instructed the correction of time or a time difference using the input unit 50 (step A1). If it is determined that there is no instruction (step A1; No), the host CPU 10 stands by. In addition, if it is determined that there is an instruction of correction (step A1; Yes), the host CPU 10 sets a correction mode according to the user's selection operation and updates the set correction mode 301 of the RAM 30 (step A3).

If the host CPU 10 determines that the set correction mode is a "time correction mode" (step A5; time correction mode), the host CPU 10 starts the GPS position calculating unit 20 in the time correction mode (step A7). That is, the host CPU 10 starts the GPS position calculating unit 20 so that the GPS satellite signal processing section 21 executes the GPS processing program 251 for time correction stored in the flash ROM 25.

Then, the host CPU 10 performs time correction mode processing by reading and executing the time correction mode processing program 402 stored in the flash ROM 40 (step A9).

Figure 9:
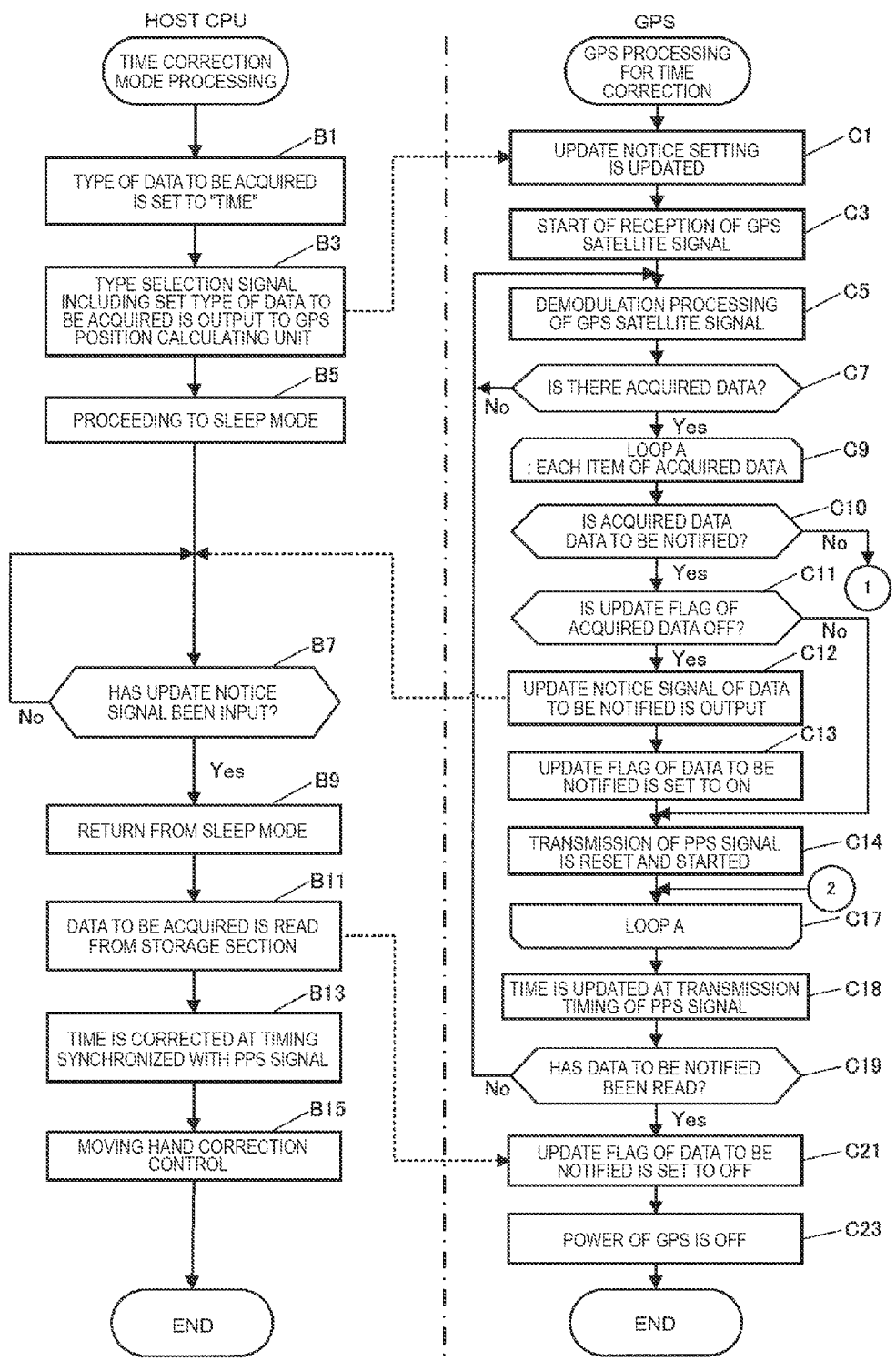
FIG. 9 is a flow chart showing the flow of time correction mode processing and the flow of GPS processing for time correction.
Figure 10:
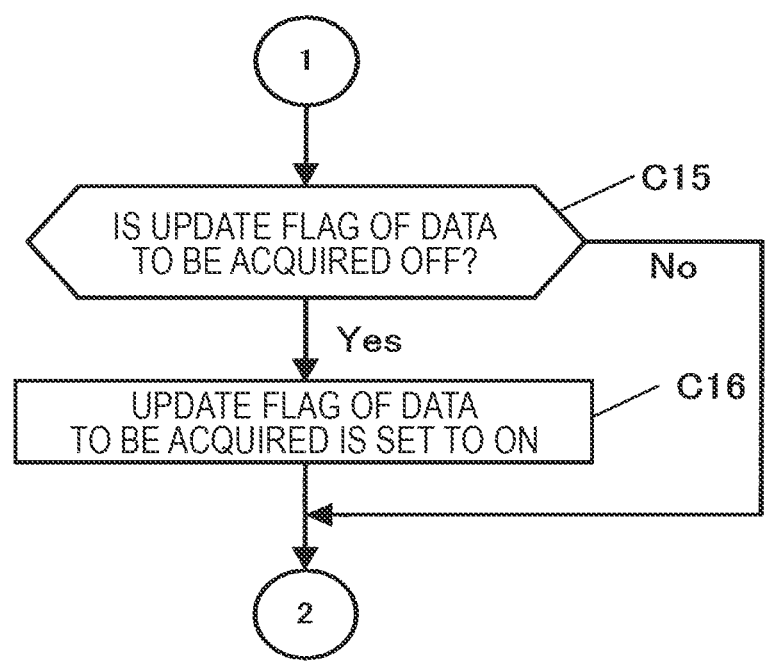
FIG. 10 is a flow chart showing the flow of time correction mode processing and the flow of GPS processing for time correction.

FIGS. 9 and 10 are flow charts showing the flow of time correction mode processing performed by the host CPU 10 and the flow of GPS processing for time correction performed by the GPS satellite signal processing section 21, and the two processings are shown side by side.

First, the host CPU 10 sets as "time" the type of data that the host CPU 10 is to acquire (data to be acquired) and updates the set type to be acquired 303 of the RAM 30 (step B1). Then, the host CPU 10 outputs to the GPS position calculating unit 20 a type selection signal including the set type to be acquired (step B3). Then, the host CPU 10 transits to a sleep mode (step B5).

The sleep mode is a mode which stops an operation of some circuits without supplying the electric power from the power supply unit 90 to at least some circuits of the host CPU 10. In the present embodiment, an electric power source is supplied only to a circuit which monitors an update notice signal, which will be described later. Transition to the sleep mode is to reduce the power consumption until the data to be acquired is acquired.

The GPS satellite signal processing section 21 updates the update notice setting data 297 of the storage section 29 on the basis of the type to be acquired which is included in the type selection signal input from the host CPU 10 (step C1). That is, the type to be acquired (here, "time") input from the host CPU 10 is set and stored in the update notice setting data 297 as a type of data (data to be notified) for update notice to the host CPU 10.

Subsequently, the GPS satellite signal processing section 21 starts receiving a GPS satellite signal from a GPS satellite (step C3) and demodulates the received GPS satellite signal (step C5). Then, the GPS satellite signal processing section 21 determines whether or not there is the acquired data (step C7). If it is determined that there is no acquired data (step C7; No), the process returns to step C5.

In addition, if it is determined that there is the acquired data (step C7; Yes), the GPS satellite signal processing section 21 executes processing of loop A for the acquired data (steps C9 to C17). In the processing of the loop A, the GPS satellite signal processing section 21 determines whether or not the acquired data is data to be notified (step C10). If it is determined that the acquired data is data to be notified (step C10; Yes), the GPS satellite signal processing section 21 determines whether or not an update flag of the acquired data, among the update flag data 296, is OFF (step C11).

Then, if it is determined that the update flag of the acquired data is OFF (step C11; Yes), an update notice signal of the data to be notified is output to the host CPU 10 (step C12). Then, the update flag of the data to be notified among the update flag data 296 is set to ON (step C13). "When the update flag of the data to be notified is OFF" is when the data to be notified is not acquired yet or when the data to be notified was read (step C19; Yes→step C21). Therefore, the processing of steps C12 and C13 is executed when the data to be notified is acquired for the first time or when the data to be notified is acquired for the first time after the data to be notified is read.

Then, the GPS satellite signal processing section 21 resets and starts the transmission of a PPS signal to the PPS signal generating section 23 (step C14). Then, the GPS satellite signal processing section 21 proceeds to processing for the next acquired data. On the other hand, if it is determined that the update flag of the acquired data is ON in step C11 (step C11; No), the GPS satellite signal processing section 21 proceeds to processing in step C14 without performing the processing in steps C12 and C13.

On the other hand, if it is determined that the acquired data is not data to be notified in step C10 (step C10; No), the GPS satellite signal processing section 21 determines whether or not the update flag of the acquired data is OFF (step C15). Then, if it is determined that the update flag is OFF (step C15; Yes), the update flag of the acquired data is set to ON (step C16), and the process proceeds to processing for the next acquired data. Then, if it is determined that the update flag data is ON (step C15; No), the process proceeds to processing for the next acquired data without performing the processing in step C16.

After the processing of the loop A regarding all items of the acquired data ends (step C17), the GPS satellite signal processing section 21 updates the time data 291 at a time matched with the transmission timing of the PPS signal (step C18). Specifically, the time data 291 is updated such that the time data 291 stored in the storage section 29 becomes a time of the transmission timing of the next PPS signal.

Then, the GPS satellite signal processing section 21 determines whether or not the host CPU 10 has read the data to be notified from the storage section 29 (step C19). If it is determined that the data to be notified has not been read yet (step C19; No), the process returns to step C5 to continue acquisition and updating of the data to be notified.

The processing of the GPS satellite signal processing section 21 for determining whether or not the host CPU 10 has read the data to be notified from the storage section 29 is performed as follows, for example. First, when the host CPU 10 reads the data from the storage section 29, the host CPU 10 designates the position (address) of the data in the storage section 29 and the data size of the data. Then, the GPS satellite signal processing section 21 transmits the data to the host CPU 10 by outputting the designated data through the data bus 95. When outputting the designate data through the data bus 95, the GPS satellite signal processing section 21 determines whether or not the designated address and data size match address and data size of the data to be notified. If it is determined that the designated address and data size match the address and data size of the data to be notified, it is determined that the host CPU 10 has read the data to be notified from the storage section 29.

In addition, when the data to be notified has been read, (step C19; Yes), the GPS satellite signal processing section 21 sets the update flag of the data to be notified to OFF (step C21). In addition, the processing for setting the update flag to OFF may also be performed by the host CPU 10. Then, the GPS satellite signal processing section 21 disconnects the power of the GPS position calculating unit 20 (step C23) to end the GPS processing for time correction.

On the other hand, in a sleep mode, the host CPU 10 monitors if an update notice signal is input from the GPS satellite signal processing section 21 (step B7). If an update notice signal is not input, the host CPU 10 continues the monitoring (step B7: No). If it is detected that an update notice signal has been input (step B7; Yes), the process returns from the sleep mode (step B9). Then, the host CPU 10 reads the time data 291, which is the data to be acquired, from the storage section 29 (step B11). Then, on the basis of the read time data 291, the host CPU 10 corrects the time at a timing synchronized with the PPS signal transmitted from the PPS signal generating section 23 (step B13).

Then, the host CPU 10 makes the moving hand control section 70 perform moving hand correction control for correcting the moving hands, so that the watch hands indicate the corrected time (step B15). Then, the host CPU 10 ends the time correction mode processing.

After returning to the main processing in FIG. 8 to perform the time correction processing, the host CPU 10 returns to step A1. On the other hand, if it is determined that the set correction mode is a "time difference correction mode" (step A5; time difference correction mode), the host CPU 10 starts the GPS position calculating unit 20 in the time difference correction mode (step A11). That is, the host CPU 10 starts the GPS position calculating unit 20 so that the GPS satellite signal processing section 21 executes the GPS processing program 253 for time difference correction stored in the flash ROM 25.

Then, the host CPU 10 performs time difference correction mode processing by reading and executing the time difference correction mode processing program 403 stored in the flash ROM 40 (step A13).

Figure 11:
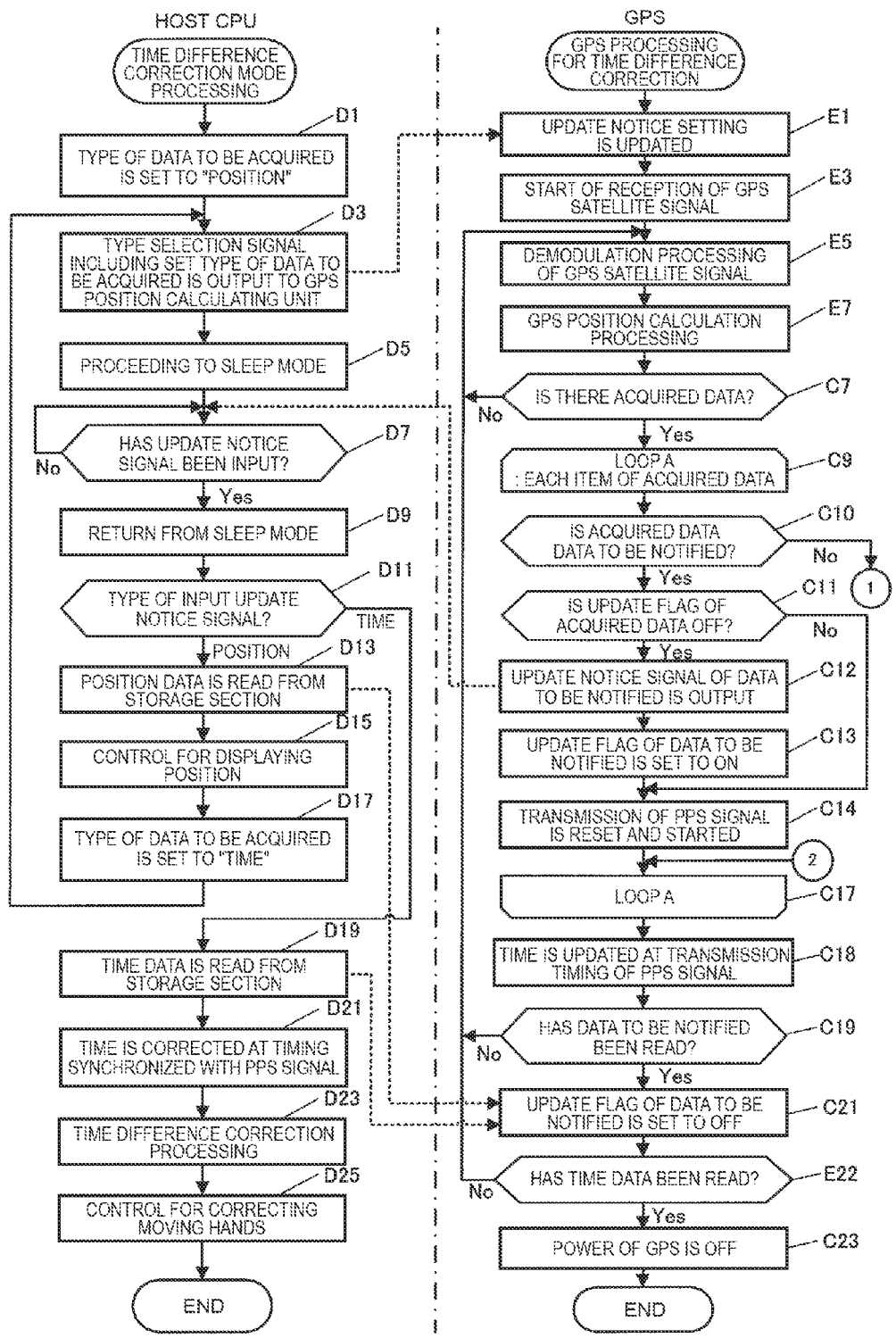
FIG. 11 is a flow chart showing the flow of time difference correction mode processing and the flow of GPS processing for time difference correction.

FIG. 11 is a flow chart showing the flow of time difference correction mode processing performed by the host CPU 10 and the flow of GPS processing for time difference correction performed by the GPS satellite signal processing section 21, and the two processings are shown side by side. In addition, the same steps as the processing in FIGS. 9 and 10 are denoted by the same reference numerals, and a detailed explanation thereof will be omitted.

First, the host CPU 10 sets the type of data to be acquired to "position" and updates the set type to be acquired 303 of the RAM 30 (step D1). Then, the host CPU 10 outputs to the GPS position calculating unit 20 a type selection signal including the set type to be acquired (step D3) and then transits to the sleep mode (step D5).

The GPS satellite signal processing section 21 updates the update notice setting data 297 of the storage section 29 on the basis of the type to be acquired which is included in the type selection signal input from the host CPU 10 (step E1). That is, the type to be acquired (position) input from the host CPU 10 is updated and stored in the update notice setting data 297 as a type of data for update notice.

Then, the GPS satellite signal processing section 21 starts receiving a GPS satellite signal (step E3), and performs GPS satellite signal demodulation processing for demodulating the received GPS satellite signal (step E5). Then, the GPS satellite signal processing section 21 performs GPS position calculation processing (step E7).

Specifically, the GPS satellite signal processing section 21 calculates the satellite information on the basis of a navigation message obtained by demodulating a GPS satellite signal and stores it in the storage section 29 as the satellite data 295. Then, the GPS satellite signal processing section 21 calculates the pseudo distance between the GPS satellite and the wristwatch 1 using the time data 291 acquired from the navigation message and the calculated satellite data 295, and calculates the position and a timepiece error of the wristwatch 1 by performing position calculation using the calculated pseudo distance. In addition, the GPS satellite signal processing section 21 calculates the moving speed and the moving direction of the wristwatch 1 by measuring a Doppler frequency of the GPS satellite signal and calculating the moving speed and the moving direction on the basis of a temporal change of the measured Doppler frequency from the last measurement.

Then, the GPS satellite signal processing section 21 performs processing in steps C7 to C17. That is, when the position data 292 which is the data to be notified has been acquired by GPS position calculation processing, if the update flag 2962 of the position data 292 is OFF, the update notice signal of the position data 292 is output to the host CPU 10 to set the update flag 2962 to ON (steps C12 and C13). Then, transmission of a PPS signal is reset and started (step C14).

In a sleep mode, the host CPU 10 monitors if an update notice signal is input from the GPS satellite signal processing section 21 (step D7). If an update notice signal is not input, the host CPU 10 continues the monitoring (step D7: No). If it is detected that an update notice signal has been input (step D7; Yes), the process returns from the sleep mode (step D9). Then, the host CPU 10 determines the type of the input update notice signal (step D11). If it is determined that the type of the update notice signal is "position" (step D11; position), the host CPU 10 reads the position data 292, which is the data to be acquired, from the storage section 29 (step D13).

Subsequently, the host CPU 10 makes a control such that the position indicated by the position data 292 read from the storage section 29 is displayed on the display unit 60 (step D15). Then, the host CPU 10 sets the type to be acquired to "time" and updates the set type to be acquired 303 of the RAM 30 (step D17), and then returns to step D3.

In this case, the GPS satellite signal processing section 21 updates and stores the "time", which is the type to be acquired input from the host CPU 10, in the update notice setting data 297 as a type of data for update notice (step E1). Then, the time data 291 is acquired by the GPS position calculation processing (step E7). When this acquisition is completed and the update flag 2961 of the time data 291 changes from OFF to ON, the update notice signal of the time data 291 is output to the host CPU 10 (steps C12 and C13). Then, transmission of a PPS signal is reset and started (step C14).

When it is determined that the type of the input update notice signal is "time" in step D11 (step D11; time), the host CPU 10 reads the time data 291, which is the data to be acquired, from the storage section 29 (step D19). Then, the host CPU 10 corrects the time at a timing which is synchronized with the PPS signal transmitted from the PPS signal generating section 23 (step D21).

Then, the host CPU 10 performs time difference correction processing for correcting the time difference (step D23). Specifically, the host CPU 10 specifies the area 4051 where the wristwatch 1 is currently located by determining in which coordinate range 4053 the coordinate value, which is indicated by the position data 292 read from the storage section 29, is included referring to the time difference data 405 of the flash ROM 40. Then, the host CPU 10 reads the time difference 4055 matched with the specified area 4051 and corrects the time difference.

Then, the host CPU 10 makes the moving hand control section 70 perform moving hand correction control for correcting the moving hands on the basis of the corrected time and the corrected time difference, so that the watch hands indicate the corrected time (step D25). Then, the host CPU 10 ends the time difference correction mode processing.

The GPS satellite signal processing section 21 determines whether or not the host CPU 10 has read the time data 291 from the storage section 20 (step E22). If it is determined that the time data 291 has not been read yet (step E22; No), the process returns to step E5. If it is determined that the time data 291 has been read (step E22; Yes), the GPS satellite signal processing section 21 disconnects the power of the GPS position calculating unit 20 (step C23) to end the GPS processing for time correction.

5. Operations and Effects

In the wristwatch 1, the host CPU 10 sets the type of data to be acquired and outputs a type selection signal including the type to be acquired to the GPS position calculating unit 20. Then, the host CPU 10 transits to the sleep mode. When the type selection signal is input from the host CPU 10, the GPS position calculating unit 20 sets the type to be acquired, which is included in the type selection signal, as the type of data to be notified and starts the acquisition of the data to be notified on the basis of the GPS satellite signal. Then, when the acquisition of the data to be notified is completed, the data to be notified is stored in the externally readable storage section 29, and the update notice signal of the data to be notified is output to the host CPU 10.

When the update notice signal is input, the host CPU 10 returns from the sleep mode to read and acquire from the storage section 29 the data to be acquired. Thus, the GPS position calculating unit 20 includes the externally readable storage section 29, the data to be acquired is stored in the storage section 29 whenever the GPS position calculating unit 20 completes the acquisition of the data to be acquired, and the update notice signal of the data to be notified is output to the host CPU 10. Accordingly, since the host CPU 10 can read the data to be acquired from the GPS position calculating unit 20 at an arbitrary timing after an update notice signal is input, the degree of freedom regarding the acquisition of data is improved. In addition, when the GPS position calculating unit 20 has newly acquired the data to be notified, the GPS position calculating unit 20 outputs to the host CPU 10 a notice signal indicating that the data to be notified has been newly acquired. Therefore, since the host CPU 10 does not perform unnecessary communication with the GPS position calculating unit 20 until the data to be acquired is acquired, the power consumption is reduced.

In addition, the host CPU 10 performs time correction processing and time difference correction processing in two modes in response to a user's instruction operation. In the time correction mode, the data to be acquired is set as time data, and the acquired time data 291 is stored in the storage section 29 by demodulating a GPS satellite signal by the GPS position calculating unit 20. In addition, a PPS signal which is a periodic signal synchronized with the time data 291 is transmitted from the GPS position calculating unit 20. The host CPU 10 reads the time data 291 stored in the storage section 29 and corrects the time on the basis of the time data 291 and the PPS signal transmitted from the GPS position calculating unit 20. Since the PPS signal synchronized with a time is periodically transmitted from the GPS position calculating unit 20, the host CPU 10 can precisely correct the time to the correct minute or second.

In the time difference correction mode, the data to be acquired is first set as position data, and the position data 292 and the time data 291 obtained by position calculation of the GPS position calculating unit 20 using a GPS satellite signal are stored in the storage section 29. The host CPU 10 displays, on the display unit 60, the position indicated by the position data 292 when the position data 292 is read from the storage section 29. In addition, the host CPU 10 changes the data to be acquired to time data and reads the time data 291 from the storage section 29, and corrects the time difference on the basis of the position data 292 and the time data 291.

The GPS position calculating unit 20 can acquire the time data 291 demodulated in a GPS satellite signal from Z-COUNT at short intervals of "6 seconds". On the other hand, the first position calculation after the start of a GPS may take tens of seconds until the acquisition of the position data 292 is completed. Accordingly, the GPS position calculating unit 20 can acquire the position data 291 a plural number of times until the time data 292 is acquired once. In the time difference correction mode, however, the host CPU 10 sets the data to be acquired as position data first so that the time data 291 is not read from the storage section 29 until the position calculation is ended by the GPS position calculating unit 20 and the position data 292 is calculated and stored. Accordingly, since unnecessary interruption processing of the host CPU 10 is prevented, the power consumption can be reduced.

Moreover, in both the time correction mode and the time difference correction mode, the host CPU 10 transits to the sleep mode until an update notice signal is input from the GPS position calculating unit 20 after outputting a type selection signal to the GPS position calculating unit 20. This can also reduce useless power consumption.

6. Modifications 6-1. Electronic Apparatus

In the above embodiment, the case where the invention is applied to the wristwatch, which is a kind of electronic apparatus, has been described. However, the electronic apparatus to which the invention can be applied is not limited thereto. For example, the invention may be applied to a mobile phone.

6-2. Satellite Position Calculating System

In the above embodiment, an explanation has been given using a GPS as an example of a satellite position calculating system. However, other satellite position calculating systems may also be used, such as WAAS (Wide Area Augmentation System), QZSS (Quasi Zenith Satellite System), GLONASS (Global Navigation Satellite System), and GALILEO.

6-3. Update Notice

In the above embodiment, the case has been described in which an update notice signal of the data to be notified is output to the host CPU 10 when the data to be notified is acquired and updated in the GPS position calculating unit 20. However, the host CPU 10 may check whether or not the data to be notified has been updated at a necessary timing (for example, at fixed intervals) without outputting the update notice signal.

In this case, if updating of the data to be acquired has ended, the data to be acquired may be read at an arbitrary timing (for example, at a timing of instruction from a user).

Figure 12:
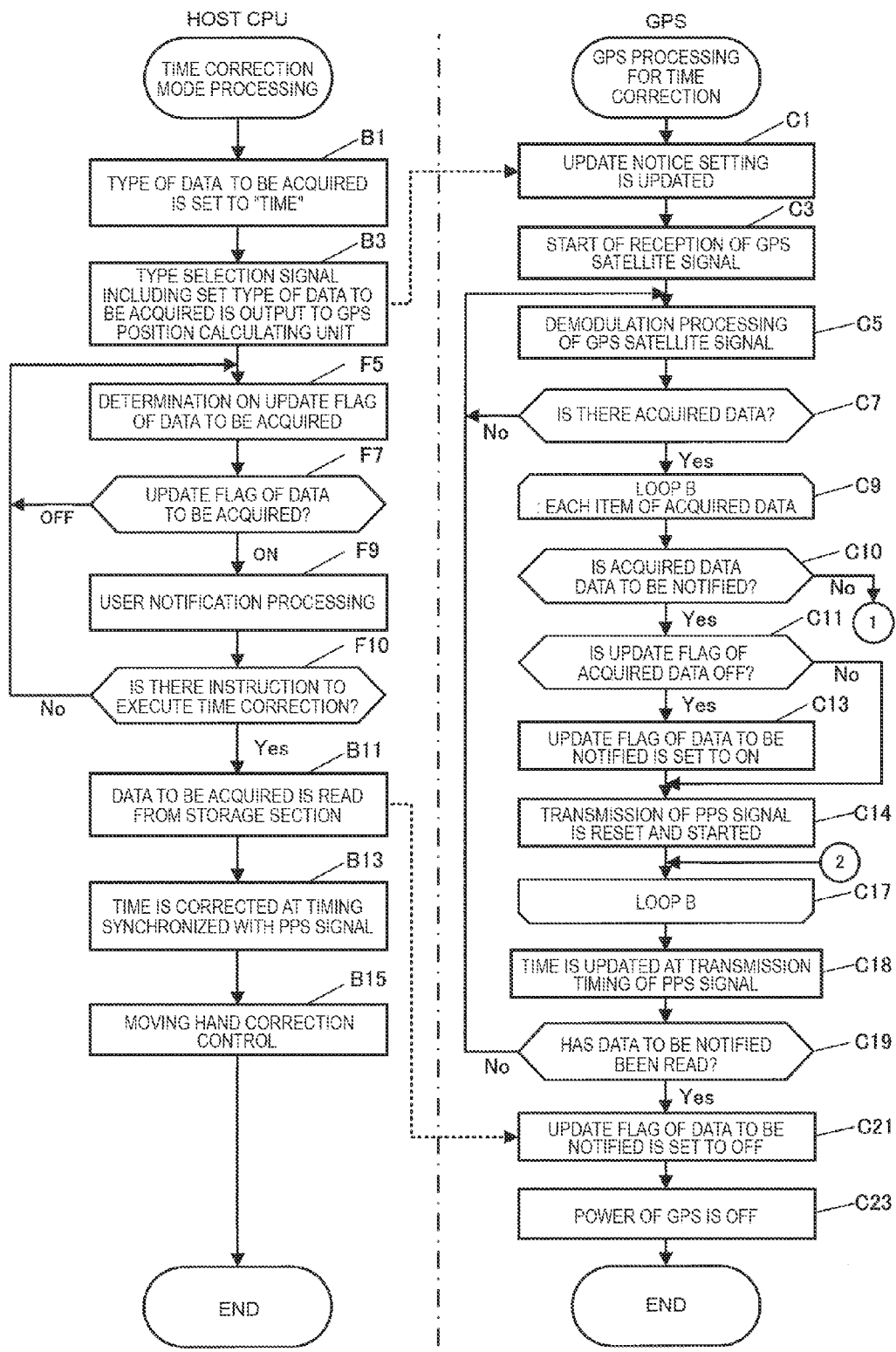
FIG. 12 is a flow chart showing modifications of time correction mode processing and GPS processing for time correction.

FIG. 12 is a flow chart showing modifications of the time correction mode processing performed by the host CPU 10 and the GPS processing for time correction performed by the GPS satellite signal processing section 21 in this case. In addition, the same steps as the time correction mode processing and the GPS processing for time correction shown in FIGS. 9 and 10 are denoted by the same reference numerals, and a detailed explanation thereof will be omitted.

In processing of a loop B performed on each item of the acquired data, if an update flag of the acquired data (data to be notified) is OFF (step C11; Yes), the GPS satellite signal processing section 21 sets the update flag of the data to be notified to ON without outputting an update notice signal to the host CPU 10 (step C13).

On the other hand, after step B3, the host CPU 10 accesses the storage section 29 to determine an update flag of the data to be acquired (step F5). If a communication load or the power consumption, which occurs whenever the host CPU 10 checks the update flag, causes a problem, this update flag determination may be performed at predetermined intervals.

If it is determined that the update flag is ON (step F7; ON), the host CPU 10 performs user notification processing in order to notify the user that the acquisition of time data has been completed (step F9). Specifically, for example, a message or a predetermined mark indicating that the acquisition of the time data 291 has been completed is displayed on the display 6 which is the display unit 60.

Then, the host CPU 10 determines whether or not the execution of time correction has been instructed by pressing the button switch 5, which is the input unit 50, by the user (step F10). If it is determined that the execution of time correction has not been instructed (step F10; No), the process returns to step F5. If it is determined that the execution of time correction has been instructed (step F10; Yes), the time data 291 which is data to be acquired is read from the storage section 29 (step B11), and the time is corrected at a timing synchronized with the PPS signal (step B13).

Although the processing described above is processing in which an update notice is omitted in the time correction mode processing and GPS processing for time correction, the same is true for the case where the output of an update notice signal is omitted in time difference correction mode processing and GPS processing for time difference correction described in FIG. 11.

6-4. Data to be Acquired

In the above embodiment, the case where the host CPU 10 acquires the time data and the position data, as the data to be acquired, from the GPS position calculating unit 20 has been described as an example. However, it is a matter of course that data other than these data items can be acquired as the data to be acquired.

As described in FIG. 4, not only the time data 291 and the position data 292 but also the moving speed data 293, the moving direction data 294, and the satellite data 295 are stored and updated in the storage section 29 of the GPS position calculating unit 20. Therefore, as long as the host CPU 10 can use these data items for various applications, these data items may be read from the storage section 29 as the data to be acquired.

For example, it is possible to read the moving speed data 293 and the moving direction data 294 and display the moving speed or the moving direction of a user on the display unit 60 or perform an inertial navigation operation using the read position, moving speed, and moving direction and display the result. In addition, it is also possible to read the satellite data 295 and display, on the display unit 60, the information including the number or types of GPS satellites captured currently and the satellite position.

6-5. Correction of Time Difference

Correction of a time difference may be performed as follows. That is, an area where the wristwatch 1 is currently located is specified on the basis of the position data 292 acquired from the GPS position calculating unit 20. Then, a time difference between the specified area and the final presence area 305, which is stored in the RAM 30, is calculated and a time obtained by performing time correction is shifted by the time difference, thereby performing the time correction.

6-6. Update Flag

In the above embodiment, the case has been described in which, when the data is newly acquired, an update flag of the acquired data is set to ON regardless of whether the acquired data is data to be notified or not. However, when the acquired data is not data to be notified, an update notice signal is not output to the host CPU 10 and the acquired data is not read by the host CPU 10. Therefore, when the acquired data is not data to be notified, processing of the update flag may be omitted.

For example, in the GPS processing for time correction shown in FIGS. 9 and 10, if it is determined that the acquired data is not data to be notified in step C10 (step C10; No), the GPS satellite signal processing section 21 proceeds to processing for the next acquired data without performing the processing in steps C15 and C16. Although not explained, the same is true for the GPS processing for time difference correction shown in FIG. 11.

The entire disclosure of Japanese Patent Application No. 2009-235998, filed on Oct. 13, 2009 is expressly incorporated by reference herein.

What is claimed is:

1. An execution method of a position calculating circuit capable of calculating a position by receiving a satellite signal transmitted from a positioning satellite and having an externally readable storage section, the execution method comprising:
   receiving a selection signal for selecting at least one of a plurality of acquired information obtainable from the satellite signal, from the outside, as data-to-be-notified;
   obtaining the plurality of acquired information from the satellite signal;
   for each of the plurality of acquired information, storing the acquired information in the storage section; and
   outputting a notice signal when the acquired information selected as the data-to-be-notified has been obtained and stored in the storage section to allow the stored acquired information to be read at an arbitrary timing without timing constraints.

2. The execution method according to claim 1, further comprising:
   outputting a periodic signal to the outside at predetermined intervals synchronized with time information, which is included in the acquired information obtained from the satellite signal, when the time information is selected as the data-to-be-notified.

3. The execution method according to claim 1,
   wherein the acquired information obtained from the satellite signal includes time information and position information,
   when the position information is selected as the data-to-be-notified, position calculation processing is executed in which the position is calculated by using the time information obtained from the satellite signal and calculating a pseudo distance, and
   while the position is being calculated by the position calculation processing, the time information, which is calculated during the execution of the position calculation processing, is stored in the storage section a plurality of times without outputting the notification signal.

4. A position calculating circuit capable of calculating a position by receiving a satellite signal transmitted from a positioning satellite, comprising:
   an externally readable storage section;
   a selection section that receives a selection signal for selecting at least one of a plurality of acquired information obtainable from the satellite signal, from the outside, as data-to-be-notified; and
   a storage control section that stores the plurality of acquired information in the storage section when the plurality of acquired information from the satellite signal being received is obtained, and that outputs a notice signal when the acquired information selected as the data-to-be-notified has been obtained and stored in the storage section to allow the stored acquired information to be read at an arbitrary timing without timing constraints.

5. A host device that controls an operation of the position calculating circuit according to claim 4, comprising:
   a selection signal output section that generates the selection signal on the basis of a user's selection operation and outputs the selection signal to the position calculating circuit;
   a determination section that determines whether or not the acquired information selected as the data-to-be-notified is stored in the storage section; and
   a reading section that reads the acquired information selected as the data-to-be-notified from the storage section when the determination section determines that the acquired information selected as the data-to-be-notified is stored in the storage section.

6. An electronic apparatus comprising:
   a position calculating circuit including:
      an externally readable storage section;
      a selection section that receives a selection signal for selecting at least one of a plurality of acquired information obtained from a satellite signal, from the outside; and
      a storage control section that stores the plurality of acquired information in the storage section when the plurality of acquired information from the satellite signal being received is obtained, and that outputs a notice signal when the selected acquired information has been obtained and stored in the storage section to allow the stored acquired information to be read at an arbitrary timing without timing constraints; and
   a host device that controls an operation of the position calculating, the host device including:
      a selection signal output section that generates the selection signal on the basis of a user's selection operation and outputs the selection signal to the position calculating circuit;
      a determination section that determines whether or not the selected acquired information is stored in the storage section; and
      a reading section that reads the selected acquired information from the storage section when the determination section determines that the selected acquired information is stored in the storage section; and
   a time measuring section that measures a time,
   wherein the acquired information obtained from the satellite signal includes time information and position information,
   the selection signal output section of the host device outputs the selection signal selecting the time information and the position information, and
   the host device further includes a time correcting section that corrects a time error, which includes a time difference of the time measured by the time measuring section, using the position information and the time information read by the reading section.

7. An electronic apparatus comprising:
   a position calculating circuit including:
      an externally readable storage section;
      a selection section that receives a selection signal for selecting at least one of a plurality of acquired information obtained from a satellite signal, from the outside;
      a storage control section that stores the plurality of acquired information in the storage section when the plurality of acquired information from the satellite signal being received is obtained; and an acquisition notifying section that transmits to the host device a notice signal, which indicates that the selected acquired information has been obtained, when the selected acquired information is obtained from the satellite signal to allow the stored acquired information to be read at an arbitrary timing without timing constraints; and a host device that controls an operation of the position calculating, the host device including:

a selection signal output section that generates the selection signal on the basis of a user's selection operation and outputs the selection signal to the position calculating circuit;

a determination section that determines whether or not the selected acquired information is stored in the storage section;

a reading section that reads the selected acquired information from the storage section when the determination section determines that the selected acquired information is stored in the storage section;

a notice detecting section that detects input of the notice signal; and a mode transition control section that makes the host device transit to a sleep mode after outputting the selection signal to the position calculating circuit and that makes the host device return to a running mode in response to the detection of the notice signal by the detecting section.

* * * * *